US007400759B2

(12) United States Patent
Cormier et al.

(10) Patent No.: US 7,400,759 B2
(45) Date of Patent: Jul. 15, 2008

(54) METHOD FOR TESTING A PLASTIC SLEEVE FOR AN IMAGE CYLINDER OR A BLANKET CYLINDER

(75) Inventors: Steven O. Cormier, Green Bay, WI (US); Diane M. Herrick, Rochester, NY (US); David R. Jackson, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 601 days.

(21) Appl. No.: 11/013,231

(22) Filed: Dec. 15, 2004

(65) Prior Publication Data

US 2005/0135669 A1 Jun. 23, 2005

Related U.S. Application Data

(60) Provisional application No. 60/531,918, filed on Dec. 23, 2003.

(51) Int. Cl.
*G06K 9/00* (2006.01)

(52) U.S. Cl. .......................... 382/141; 399/31; 399/130

(58) Field of Classification Search ................. 250/306, 250/310; 382/141, 152, 149; 399/149, 159, 399/174, 176, 270, 31, 130, 276; 403/106.1, 403/108.1, 122, 125
See application file for complete search history.

(56) References Cited

U.S. PATENT DOCUMENTS

| | | | | |
|---|---|---|---|---|
| 6,416,175 | B2 * | 7/2002 | Furukawa et al. | 347/103 |
| 7,043,175 | B2 * | 5/2006 | Komoto et al. | 399/159 |
| 2002/0115011 | A1 * | 8/2002 | Komoto et al. | 430/125 |
| 2003/0152856 | A1 * | 8/2003 | Mizoe et al. | 430/108.1 |
| 2004/0183013 | A1 * | 9/2004 | Nakasuji et al. | 250/310 |
| 2004/0263992 | A1 * | 12/2004 | Peng et al. | 359/642 |
| 2005/0092921 | A1 * | 5/2005 | Nakasuji et al. | 250/306 |
| 2005/0134071 | A1 * | 6/2005 | Yamashita et al. | 296/37.5 |
| 2005/0135669 | A1 * | 6/2005 | Cormier et al. | 382/152 |
| 2005/0136206 | A1 * | 6/2005 | Cormier et al. | 428/36.91 |
| 2005/0138809 | A1 * | 6/2005 | Tan et al. | 29/895.3 |
| 2007/0057186 | A1 * | 3/2007 | Nakasuji et al. | 250/310 |
| 2007/0205531 | A1 * | 9/2007 | Cormier et al. | 264/238 |

* cited by examiner

*Primary Examiner*—Gregory M Desire

(57) ABSTRACT

This invention relates to a method for testing a plastic sleeve for use with an image cylinder or a blanket cylinder in an electrophotographic process.

20 Claims, 4 Drawing Sheets

METHOD FOR TESTING A PLASTIC SLEEVE FOR AN IMAGE CYLINDER OR A BLANKET CYLINDER

CROSS REFERENCE TO RELATED APPLICATION

Reference is made to and priority claimed from U.S. provisional application Ser. No. 60/531,918, Filed on Dec. 23, 2003, entitled: A METHOD FOR TESTING A PLASTIC SLEEVE FOR AN IMAGE CYLINDER OR A BLANKET CYLINDER.

FIELD OF THE INVENTION

This invention relates to a method for testing a plastic sleeve for use with an image cylinder, or a blanket cylinder, in an electrophotographic process by use of a line scan video camera and a programmed computer.

BACKGROUND OF THE INVENTION

In electrophotographic processes requiring an image cylinder and a blanket cylinder to produce electrophotographic copies, the image cylinder typically receives a uniform charge, an image-wise charge reduction, and a toner coating on the resultant image area, and then transfers the toner image to a blanket cylinder. The blanket cylinder transfers the toner image to a substrate, such as paper or the like, which passes via a web between the blanket cylinder and a back pressure roller to transfer the toner image to the substrate with the substrate thereafter being fused, as well known to the art.

In such processes, the image cylinder has a cylinder that typically includes a mandrel, which may be of aluminum, steel or any other suitably durable metal or conductive plastic of a suitable thickness to produce a noncompliant member that may be about 10 millimeters (mm) in thickness. The mandrel may include reinforcing structure internally and includes a very smooth, low out-of-round tolerance exterior. The image cylinder includes a mandrel and a sleeve positioned over the outside of the mandrel and is used for production and transfer of the images to the blanket cylinder. The mandrel also includes bearings connected to each of its ends for positioning it in an electrophotographic copying machine and has an air inlet into an interior of the mandrel for an air discharge through a plurality of holes placed around one end of the mandrel near a tapered end of the mandrel.

The blanket cylinder has a cylinder that typically includes a mandrel, which may be of aluminum, steel or any other suitably durable metal or conductive plastic of a suitable thickness to produce a noncompliant member that may be about 10 millimeters (mm) in thickness. The mandrel may include reinforcing structure internally and includes a very smooth, low out-of-round tolerance exterior. The blanket cylinder includes a mandrel and a sleeve positioned over the outside of the mandrel and is used for transfer of the images from the blanket cylinder to a substrate. The mandrel also includes bearings connected to each of its ends for positioning it in an electrophotographic copying machine and has an air inlet into an interior of the mandrel for an air discharge through a plurality of holes placed around one end of the mandrel near a tapered end of the mandrel.

The sleeves have been produced by use of a metal core, which is typically a noncompliant metal member, such as nickel or the like, which is produced by plating. The core must be seamless and must provide a very low variation surface outer diameter. The plastic layer is then positioned around the outside of the metal core, the metal core is mounted on a mandrel or the like, and the plastic layer is machined to a desired thickness. Recently processes have been proposed that do not require a core. Additional exterior coatings have been applied to the sleeves by techniques such as ring coating and the like. The completed sleeve will have an internal diameter slightly less than the outer diameter of the mandrel upon which it is to be placed. This interference fit allows the sleeve to be firmly positioned on the outside of the mandrel after it is installed. The sleeve must have a smooth exterior and a closely controlled wall thickness.

The sleeve is typically installed by urging it toward and onto the tapered end section of the mandrel while air is ejected through the holes at the end of the mandrel near the tapered section. The air injection permits the positioning of the sleeve on the mandrel by an air bearing technique as known to those skilled in the art. The interference fit between the sleeve and the mandrel is accomplished and the sleeve is retained snugly and firmly in position on the outside of the mandrel. The outside of the mandrel, including the sleeve, must have an outside diameter variation within a range of about ±12.5 microns. This close tolerance is necessary to ensure accurate receipt of images from the image cylinder and transmission of the images to the substrate by the blanket cylinder.

There are various other specific requirements for the blanket cylinder and it has been previously considered necessary to meet these other requirements as well as those discussed above by the use of a metal core in the sleeve. This is a relatively expensive, time-consuming step and the cores are relatively expensive. As a result, a continued effort has been directed to the development of methods for producing sleeves more economically that will meet the demanding requirements for the blanket cylinder sleeves.

SUMMARY OF THE INVENTION

According to the present invention, sleeves for use as a image cylinder sleeve or a blanket cylinder sleeve for an electrophotographic process are tested by positioning a sleeve having an outside on a support; positioning a line scan video camera adapted to produce an image of the outside of the sleeve useable with image-producing software; rotating the outside of the sleeve relative to the line scan video camera in a pattern to move the outside of the sleeve through an image area of the line scan video camera; passing a product data stream indicative of images of the outside of the sleeve to a computer programmed with a software program to receive and analyze the product data stream; analyzing the product data stream to determine the presence and severity of defects in the outer surface of the sleeve; and, compiling a record of the presence and severity of the defects.

The invention further provides for testing a sleeve for use as an image cylinder sleeve or a blanket cylinder sleeve for an electrophotographic process by positioning a sleeve having an outside on a support; positioning a line scan video camera adapted to produce an image of the outside of the sleeve useable with image producing software; rotating the line scan video camera around the outside of the sleeve in a pattern to view the outside of the sleeve in an image area of the line scan video camera; passing a product data stream indicative of images of the outside of the sleeve to a computer programmed with a software program to receive and analyze the product data stream; analyzing the product data stream to determine the presence and severity of defects in the outer surface of the sleeve; and, compiling a record of the presence and severity of the defects.

DESCRIPTION OF PREFERRED EMBODIMENTS

In the description of the figures., the same numbers will be used to refer to the same or similar components throughout in the discussion of the figures.

Figure 1:
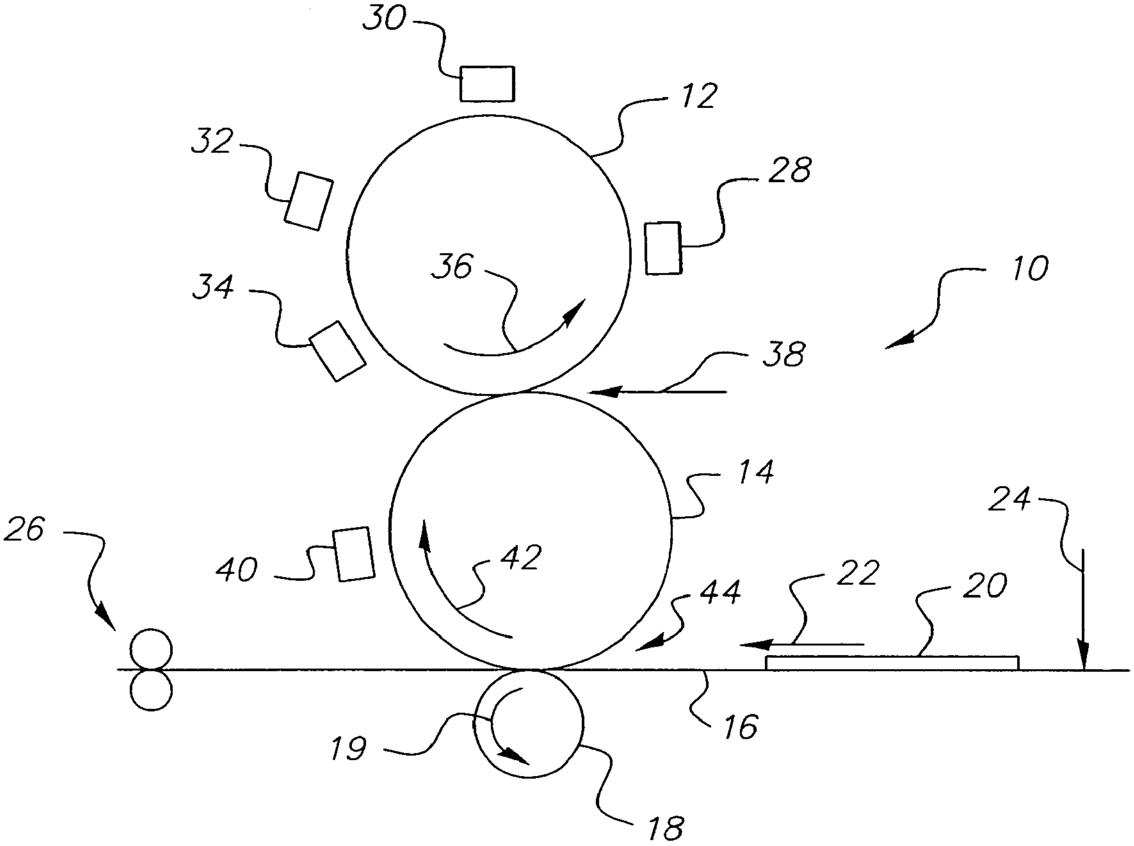
FIG. 1 shows an embodiment of a process and system wherein an image cylinder and a blanket cylinder tested according to the present invention are used.

In FIG. 1, an electrophotographic process and system 10 are shown. The process includes an image cylinder 12 positioned in engagement with a blanket cylinder 14, which is positioned in engagement with a web 16 and a back-pressure roller 18. A substrate 20, which may be paper or the like, is passed along a web 16 between blanket cylinder 14 and back pressure roller 18. The substrate, now bearing an image, is passed along web 16 to a fuser section 26, where it is fused as known to those skilled in the art. The direction of travel of the substrate is shown by arrow 22. A sensor 24 is positioned to ensure that substrate 20 passes in contact with blanket cylinder 14 at a proper time so that the image is properly positioned on substrate 20.

In the operation of the process, image cylinder 12 rotates in a direction shown by arrow 36 and blanket cylinder 14 rotates in a direction shown by arrow 42. Back pressure roller 18 turns in a direction as shown by arrow 19. A nip 38 is formed between image cylinder 12 and blanket cylinder 14. The nip is typically about 4.5±1 mm in width. Similarly, a nip 44 is formed between blanket cylinder 14 and back pressure roller 18. This nip is about 4 to about 10 mm in width.

A cleaning station 28 is positioned to contact the surface of image cylinder 12 after it passes nip 38. The clean cylinder surface then passes a charger station 30, a writer station 32 where an electrostatic image is placed on the surface of cylinder 12 and a toner section 34 that applies toner to the electrostatic image, which is then transferred at nip 38 to blanket cylinder 14. Blanket cylinder 14 transfers the image to substrate 20 and is thereafter cleaned by a cleaner 40 to ensure that a clean surface is provided on blanket cylinder 14 for transfer of an additional image from image cylinder 12. While not shown, the image cylinder and the blanket cylinder include suitable supports and bearings in operative engagement with the ends of the cylinders to support the cylinders for rotation as discussed above.

Image cylinder 12 and blanket cylinder 14 are both of similar construction, although the materials and properties of their exteriors are different.

The image cylinder typically will include on its surface a photosensitive material. Such photosensitive materials are well known to those skilled in the art and as placed on the surface must result in a surface that is within required tolerances for the image cylinder. Such tolerances are typically a mandrel variation of about ±12.5 microns in diameter or out-of-round run out. Desirably the variations in the wall thickness of the sleeve are held to a thickness variation of ±2.5 microns from the average wall thickness.

The blanket cylinder is of similar construction except that normally a durable material such as a ceramer or a fluorocarbon polymer or copolymer is positioned on its exterior. In both instances the materials may be deposited on the exterior of the sleeve by ring coating, dipping or the like as known to those skilled in the art.

The image cylinder may have a diameter from about 2 cm to about 400 cm. While the mandrel diameter may vary widely, the variations in diameter or the out of round run out must be limited to ±12.5 microns. This is necessary to ensure that the proper nip is achieved with the blanket cylinder and that good image transfer is accomplished.

Desirably the outside of the image cylinder sleeve has a Shore A hardness of about 90±10. The hardness is readily varied by changing the formulation of the plastic, as well known to those skilled in the art. The thickness of the sleeve wall may be from about 125 to about 1000 mm. The sleeve wall is plastic and is rigid enough to handle. Further the plastic desirably has a conductivity of at least $10^{10}$ ohms·cm. As known to those skilled in the art, the plastic can be somewhat more conductive if desired. To produce an acceptable exterior surface on image cylinder 12, it is necessary that the wall thickness of the sleeve be held to a thickness variation of ±2.5 microns.

The blanket cylinder may have a diameter from about 2 cm to about 400 cm. While the mandrel diameter may vary widely, the variations in diameter or the out of round run out must be limited to ±12.5 microns. This is necessary to ensure that the proper nip is achieved with the blanket cylinder and the image cylinder and that good image transfer from the image cylinder to the blanket cylinder and from the blanket cylinder to the substrate is accomplished.

Desirably the outside of the blanket cylinder sleeve has a Shore A hardness of about 60±5. The hardness is readily varied by changing the formulation of the plastic, as well known to those skilled in the art. The thickness of the sleeve wall may be from about 1 to about 20 mm. The sleeve wall is plastic and is rigid enough to handle. Further the plastic desirably has a conductivity of at least $10^8$ to $10^{14}$ ohms·cm. Generally the conductivity of the blanket cylinder sleeve is less than for the image cylinder sleeve, although the charge on the blanket cylinder is typically higher than that on the image cylinder. To produce an acceptable exterior surface on blanket cylinder 14, it is necessary that the wall thickness of the sleeve be held to a wall thickness variation of ±12.5 microns. Generally the blanket cylinder sleeve exterior is more compliant than the exterior of the image cylinder sleeve.

Sleeves have been formed in the past by positioning the sleeves on a seamless metal core typically formed by plating. The metal core provided support for the positioning of the plastic around the metal core and then the plastic was machined to the required size. Both the requirement for the metal core and the requirement for machining represent expensive and time consuming operations that have been required to achieve the precision necessary to produce the sleeves for the blanket cylinder. Recently methods for producing such sleeves without a metal core have been proposed.

As well known to those skilled in the art, an image-accepting layer is required on the outside of the image cylinder. This layer has been applied by processes, such as ring coating, dipping and the like. It is also known that inorganic or organic layers may be applied over the image-accepting layer to modify surface properties such as surface energy. The use and application of outer layers is not considered to constitute part of the present invention, which is directed to the production of a sleeve for an image cylinder meeting the exacting requirements for such a sleeve.

Typically the wall of the sleeve is at least partially comprised of thermoplastic or thermosetting plastics or combinations thereof and particularly, polyurethanes are preferred. The properties of the plastics may be varied as known to those skilled in the art to produce the desired properties in the sleeve.

Such sleeves when completed must meet various strict requirements for use as blanket cylinder sleeves or an image cylinder sleeves. The completed blanket cylinder sleeves must have a wall thickness that varies no more than ±12.5 microns from the average wall thickness. Defects in the surface of the sleeve are unacceptable since such defects result in defects in the copies produced using the image cylinder and the blanket cylinder including the sleeves. Such defects, if present in significant number, are unacceptable. Such defects may constitute irregularities in the surface, pits, protrusions or the like.

Previously an operator has examined such sleeves by manually examining each sleeve for such defects to reach an accept/reject decision. This is a relative non-reproducible method, provides no record of what defects were found, where the defects were located and is subject to the skill of the operator and the condition of the operator such as whether the operator is tired or the like. A more objective method is highly desirable as is a method for providing a record of the defects upon which the accept/reject decision has been made.

Such a method is provided by the present invention. As discussed previously, the processes in which the sleeves are used use an image cylinder and a blanket cylinder to produce the image and transmit it to a substrate.

Figure 2:
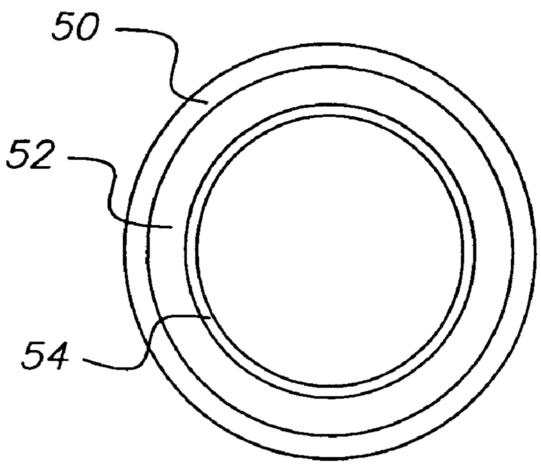
FIG. 2 (PRIOR ART)
FIG. 2 is a cross-sectional view of a sleeve useful as an image cylinder sleeve or a blanket cylinder sleeve.

As shown in FIG. 2, in some instances the sleeve includes an inner metal core 54 that is typically produced by plating and must be produced to very close tolerances which is surrounded by a plastic layer 52 which has been produced by positioning the plastic material on the core and thereafter rotating the sleeve and machining the plastic layer to a desired thickness and configuration. Thereafter an outer coating 50 is positioned around the sleeve. With the blanket cylinder sleeve this coating will typically be a ceramer, fluorocarbon polymer or copolymer or other durable coating. With the image cylinder sleeve, the outer coating 50 will include an image-accepting material that may be coated with further plastic or other materials to protect it during operation. In either event, the outer surface must be smooth and meet quality requirements.

Figure 3:
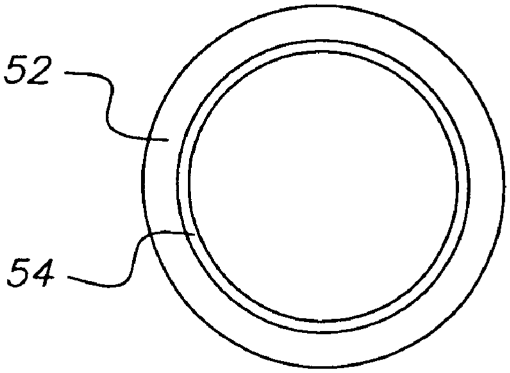
FIG. 3 (PRIOR ART)
FIG. 3 is a cross-sectional view of an embodiment of the plastic wall of a sleeve including a metal core.

In FIG. 3, an alternate embodiment is shown for the sleeve upon which outer layer 50 is subsequently positioned. The sleeve includes a plastic layer 52 and a metal core 54.

Figure 4:
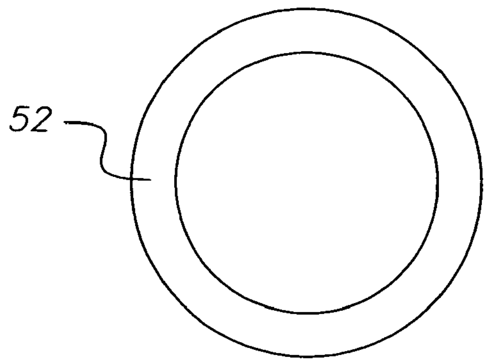
FIG. 4 is cross-sectional view of a plastic body of a sleeve including no metal core.

In FIG. 4, a sleeve is shown which includes no metallic core but instead has only the plastic layer 52.

Figure 5:
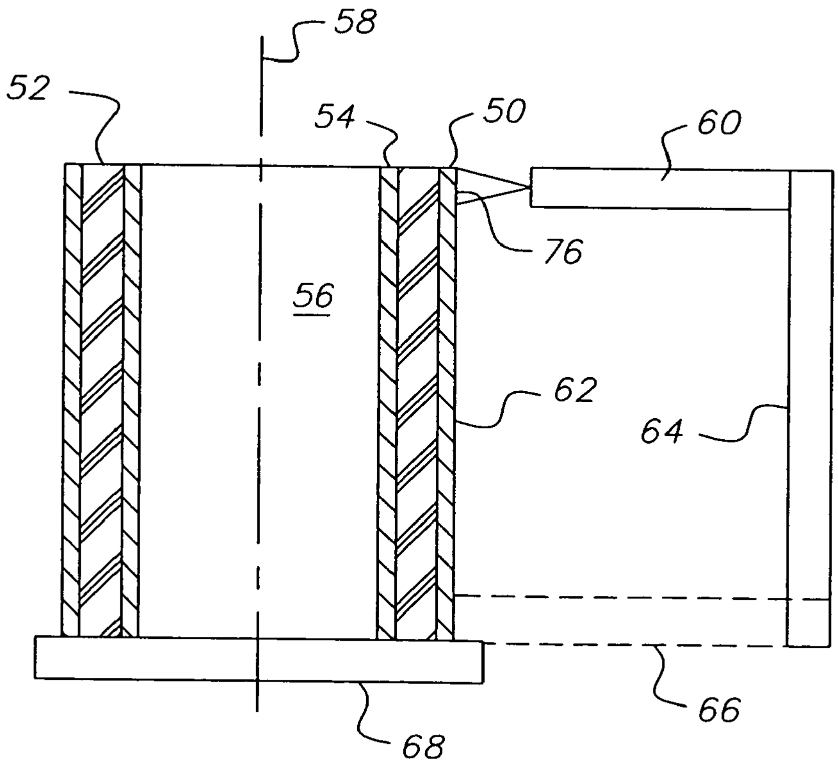
FIG. 5 is a sleeve positioned relative to a line scan video camera supported to produce images of the outside of the sleeve along its length.

In FIG. 5, a sleeve includes a core 54, a plastic layer 52 and an outer coating 50 is shown positioned on a mandrel or other support 56 for rotation about its longitudinal axis 58. The mandrel and sleeve are supported on a support 68. A line scan video camera 60 is positioned to scan an image area 76 of the sleeve. The sleeve is mounted for rotation and is rotated past the line scan video camera to produce a helical image that is then processed by image software to produce a defect map for acceptance or rejection. The camera is mounted for motion upwardly and downwardly along a support 64 with the camera ultimately reaching a position shown by dotted line 66. This produces an image of the entire surface of the sleeve that may be magnified and displayed.

Figure 6:
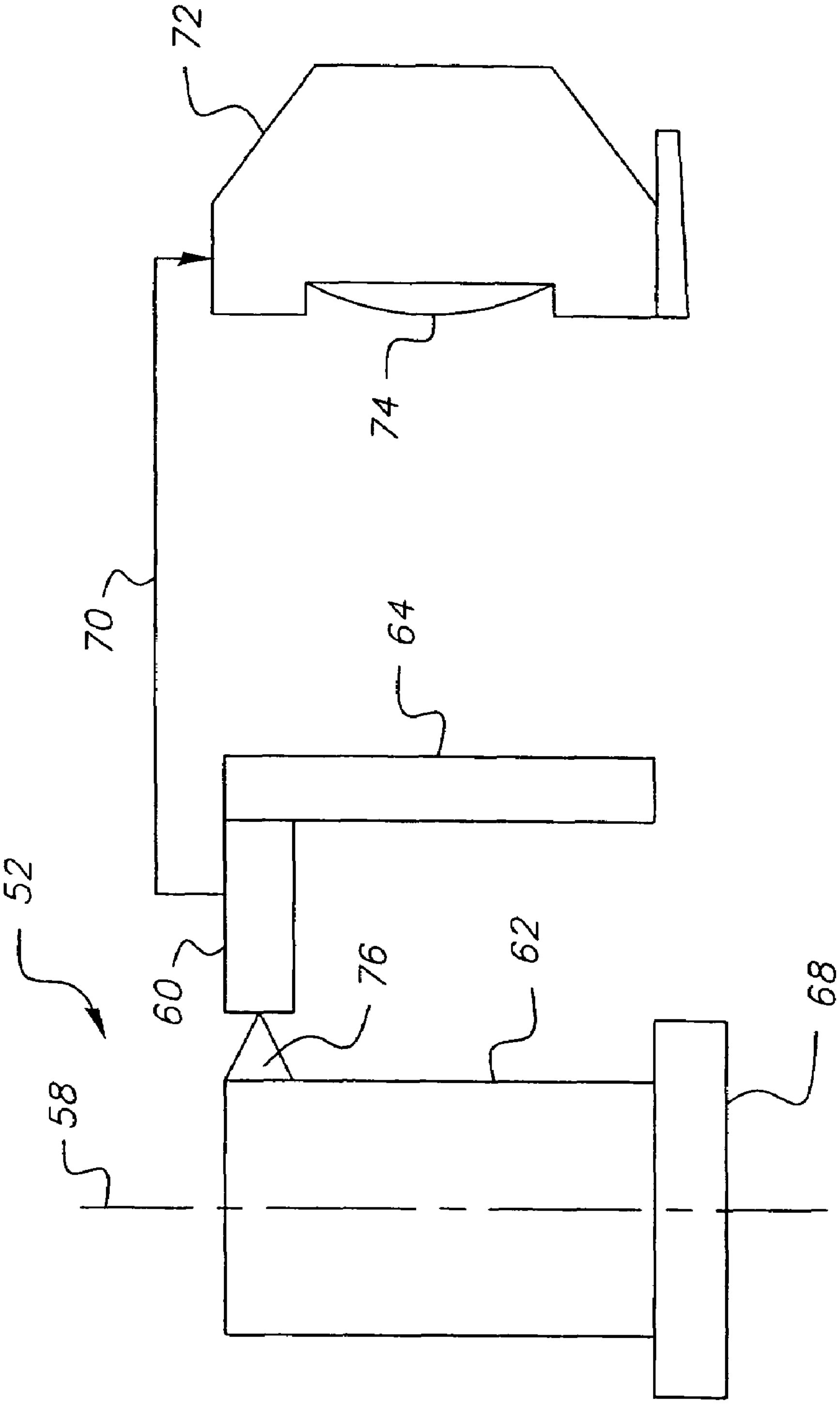
FIG. 6 is a schematic diagram of the test method of the present invention.

The system for performing the test is shown in greater detail in FIG. 6. The signals from line scan video camera 60 are passed via a line 70, which may include a wire connection or a wireless connection to a computer 72 including a screen 74 where the data from the line scan video camera is analyzed to detect defects on the outer surface 62 of sleeve 52. The defects are detected by measuring the defect for size and optical density. If the calculated area or density is above preset limits, the sleeve is set aside for reject analysis. If a defect cannot be described by area, length or optical density, then a custom image algorithm is generated and all defects that conform to the custom are marked for reject. The image of the entire surface area of the cylinder is then stored in memory for future reference and offline analysis. The same system may be used to analyze the surface of the cylinder prior to the application of any surface treatment such as a ceramer, photo image materials or the like.

During analysis of the sleeve surface for defects, a display of defects determined is available for observation on computer screen 74 by an operator. Further a record is made of the entire surface and the location of each defect and its severity is recorded. The software then determines whether the defects exceed the standard for an acceptable sleeve and provide an accept/reject decision.

Conventional computers, such as a Power MAC, may be used for this determination. Similarly conventional line scan video cameras, such as a DALSA minicam, may be used.

Software that provides image recognition capabilities, such as the Imagexpert program, is acceptable. The equipment may require slight modification as known to those skilled in the art to accomplish the objectives set forth above. Further, the software may be modified to produce the desired criteria.

Typically the defects detected may be as small as about 200 $micron^2$ in area and may be as shallow as 6 microns. Defects of this size may be difficult to observe by the human eye but are readily observed by the line scan video camera. Typically the camera and software can be calibrated to recognize defects as small as 10 microns in cross-section and 3 microns in depth. In the event that defects of these sizes are not considered to be detrimental for a particular application, the system can be adjusted to either detect only larger defects or to eliminate such defects from the determination as to whether the sleeve is acceptable or a reject.

While it is preferred that the sleeve be rotated, it is possible that the camera could be rotated around the sleeve. This is considered to be less desirable from a mechanical and efficiency point of view. While the measurements could be made in this fashion, it is preferred that the measurements be made by using a fixed location camera that is raised and lowered as described previously with a rotatable sleeve.

By the method of the present invention, the previous test method has been improved by providing a record of the number and location of defects, by providing a reproducible test method and by improving the efficiency of the test method. For instance it typically requires at least 15 minutes for a skilled examiner to examine a sleeve exterior whereas the same test can be done much more efficiently and in less time using the test method of the present invention.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for testing a plastic sleeve for use as an image cylinder sleeve or a blanket cylinder sleeve for an electrophotographic process, the method comprising:

a) positioning a sleeve having an outside on a mandrel;

b) positioning a line scan video camera adapted to produce a magnified image of the outside of the sleeve useable with image producing software;

c) rotating the outside of the sleeve relative to the line scan camera in a pattern to move the outside of the sleeve through an image area of the line scan camera;

d) passing a product data stream indicative of images of the outside of the sleeve to a computer programmed with a software program to receive and analyze the product data stream;

e) analyzing the product data stream to determine the presence and severity of defects in the outer surface of the sleeve; and, f) compiling a record of the presence and severity of the defects.

2. The method of claim 1 wherein the defects are compared to a selected standard to determine whether the sleeve is acceptable.

3. The method of claim 1 wherein the line scan camera is moved along the length of the sleeve as the sleeve rotates.

4. The method of claim 1 wherein a depth and a cross-sectional measurement of the defects are detected.

5. The method of claim 1 wherein defects no more than 3 microns in depth are detected.

6. The method of claim 1 wherein defects no more than about 10 microns in cross-section are detected.

7. The method of claim 1 wherein the product data stream is processed by the software program to measure the defects for size and optical density.

8. The method of claim 1 wherein the software program supplies an acceptable or a reject report.

9. The method of claim 8 wherein the software program supplies a compilation of al defects in the sleeve.

10. The method of claim 9 wherein the compilation is displayed on a computer screen.

11. The method of claim 10 wherein the identification of defects during the testing is displayed on a computer screen.

12. The method of claim 1 wherein the sleeve is an image cylinder sleeve.

13. The method of claim 12 wherein the sleeve has a wail thickness from about 125 to about 1000 microns.

14. The method of claim 1 wherein the sleeve is a blanket cylinder sleeve.

15. The method of claim 14 wherein the sleeve has a wall thickness from about 1 to about 10 mm.

16. The method of claim 15 wherein the wall thickness of the sleeve has a variation from the average wall thickness of about +/−12.5 microns.

17. The method of claim 1 wherein the sleeve is a plastic sleeve.

18. The method of claim 1 wherein the sleeve includes a metal core.

19. A method for testing a plastic sleeve for use as an image cylinder sleeve or a blanket cylinder sleeve for an electrophotographic process, the method comprising:

a) positioning a sleeve having an outside on a mandrel;

b) positioning a line scan video camera adapted to produce a magnified image of the outside of the sleeve useable with image producing software;

c) rotating the line scan camera around the outside of the sleeve in a pattern to move the outside of the sleeve through an image area of the line scan camera;

d) passing a product data stream indicative of images of the outside of the sleeve to a computer programmed with a software program to receive and analyze the product data stream;

e) analyzing the product data stream to determine the presence and severity of defects in the outer surface of the sleeve; and, f) compiling a record of the presence and severity of the defects.

20. The method of claim 19 wherein the defects are compared to a selected standard to determine whether the sleeve is acceptable.

* * * * *